April 20, 1926.
L. W. FETSCHAN
FOOD CUTTER
Filed March 20, 1925
1,581,310
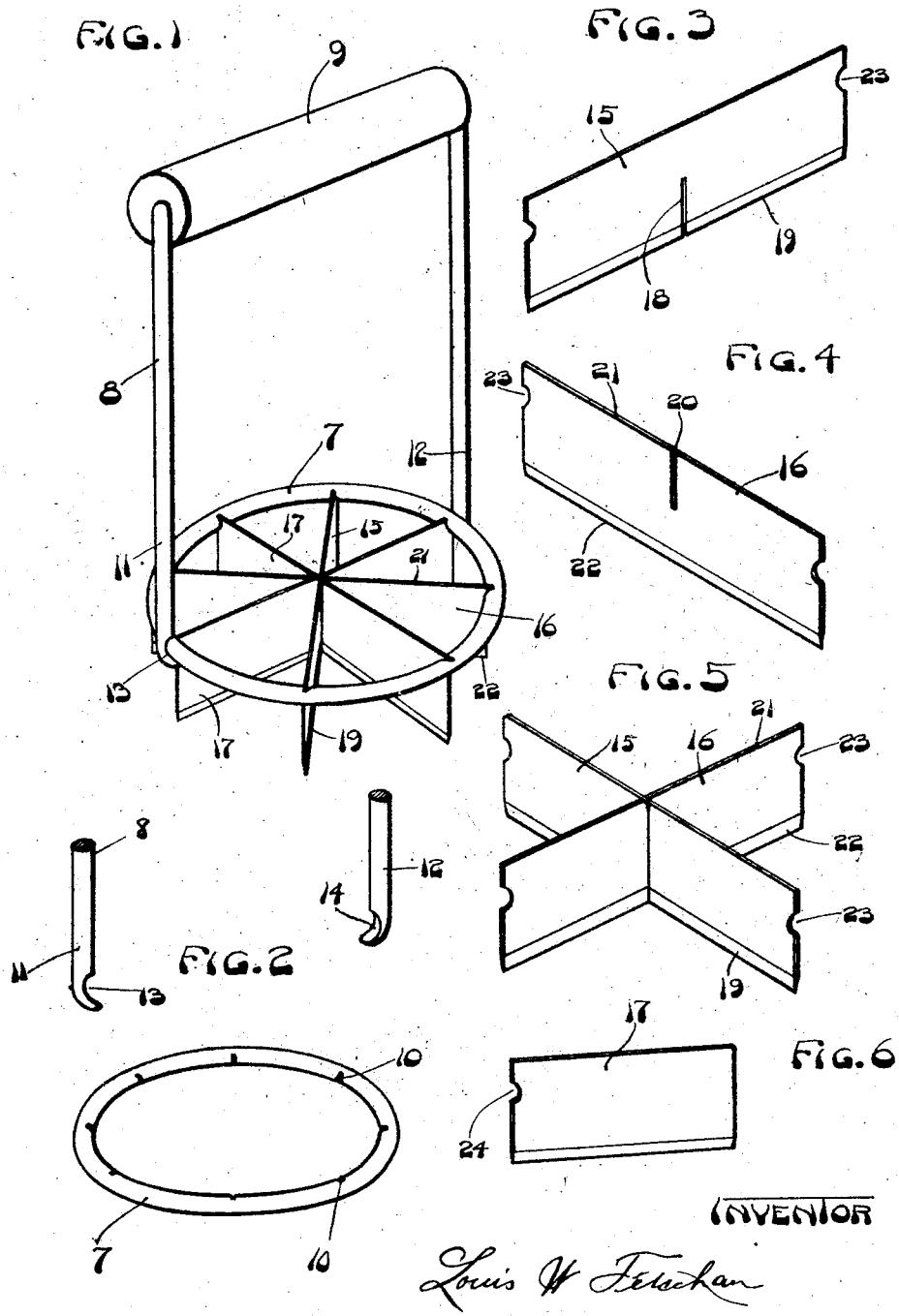

Patented Apr. 20, 1926.

1,581,310

UNITED STATES PATENT OFFICE.

LOUIS W. FETSCHAN, OF CINCINNATI, OHIO.

FOOD CUTTER.

Application filed March 20, 1925. Serial No. 17,135.

*To all whom it may concern:*

Be it known that I, LOUIS W. FETSCHAN, a citizen of the United States, residing at Cincinnati, in the county of Hamilton and State of Ohio, have invented new and useful Improvements in a Food Cutter, of which the following is a specification.

This invention relates to a device which may be used in so many capacities in connection with food and its final preparation for consumption that the term above applied may be very aptly applied. In fact, among its many uses may be mentioned its use as a vegetable cutter or chopper, a steak tenderer, and even as a cutter of pies if made of sufficient size, while another use may be in a similar capacity to cut fruits.

To produce a device capable of these usages has been the object of my invention and such has been accomplished in the device to be described presently and which has been disclosed in the accompanying drawing in which:—

Fig. 1 is a perspective view of a food cutter embodying my invention.

Fig. 2 is a fragmental composite view of the frame elements in separated relation.

Figs. 3 and 4 are detail perspective views of the main cutter blades.

Fig. 5 is a perspective view of the blades shown in Figs. 3 and 4, in assembled relation.

Fig. 6 is a perspective view of one of the additional blades necessary to complete the blade assembly of the cutter.

In its construction the cutter consists of a frame having a ring 7 which holds all the blades, a bail 8, and a handle 9, the blades themselves being referred to later in a more specific manner.

The ring 7 is such as shown in detached perspective in Fig. 2 and preferably has a series of uniformly spaced notches 10 which serve to locate the blades within the ring. The rail 8 has its ends 11 and 12 formed with ring fitting depressions 13 and 14 adapted to receive the ring and to be soldered or otherwise suitably rigidly secured thereto.

The blades consist of two main blades 15 and 16 which extend diametrically across the ring at right angles to each other, and a series of radially extending blades 17 which are so positioned as to bisect the right angles formed by the main blades. These main blades are notched as shown in Figs. 3 and 4, blade 15 having a notch 18 extending half way across its width and centrally positioned between its ends, the notch being cut in from the cutting edge 19. Blade 16 is notched in a similar manner, but its notch 20 extends from the back 21 instead of its cutting edge 22. Thus when they are placed together they will occupy the positions shown in Fig. 5. Slight notches 23 are formed at the ends of the blades where they are to engage the notches of the ring. The radial blades 17 are each provided with a notch 24 in one end to perform the same function as do notches 23. After the blades have been assembled with the ring, all the joints may be suitably secured, as by solder, in order to produce a rigid construction.

The use of the device is quite obvious, and its adaptability to different purposes may depend somewhat upon its size, as for example in cutting pie, cake, or other food products of large dimensions. The shape of the blades may also be varied if desired, it being quite unnecessary to adhere to the exact embodiment shown in order to comply strictly to the terms of the following appended claim.

Having thus described my invention what I claim is:—

A food cutter consisting of a ring with blade spaced apart depressions cut into the inner face thereof, a series of blades located in radially spaced relation within the ring, said blades being suitably notched at their outer upper ends to fit the depressions within the ring, and a handle extending from the ring.

In witness whereof, I affix my signature.

LOUIS WM. FETSCHAN.